(12) United States Patent  
Bobbitt et al.

(10) Patent No.: US 8,761,451 B2  
(45) Date of Patent: Jun. 24, 2014

(54) SEQUENTIAL EVENT DETECTION FROM VIDEO

(71) Applicant: International Business Machines Corporation, Armonk, NY (US)

(72) Inventors: Russell P. Bobbitt, New York, NY (US); Lei Ding, Columbus, OH (US); Quanfu Fan, Somerville, MA (US); Sachiko Miyazawa, White Plains, NY (US); Sharathchandra U. Pankanti, Darien, CT (US); Yun Zhai, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/968,846

(22) Filed: Aug. 16, 2013

(65) Prior Publication Data

US 2013/0336531 A1    Dec. 19, 2013

Related U.S. Application Data

(63) Continuation of application No. 12/834,104, filed on Jul. 12, 2010, now Pat. No. 8,548,203.

(51) Int. Cl.  
*G06K 9/00* (2006.01)

(52) U.S. Cl.  
USPC .......................................... 382/107; 382/103

(58) Field of Classification Search  
USPC ................. 382/107, 159, 181, 190, 209, 236  
See application file for complete search history.

(56) References Cited

U.S. PATENT DOCUMENTS

| | | | |
|---|---|---|---|
| 6,847,980 B1 | 1/2005 | Benitez et al. | |
| 7,468,662 B2 | 12/2008 | Velipasalar et al. | |
| 7,631,808 B2 | 12/2009 | Kundu et al. | |
| 8,294,763 B2 | 10/2012 | Cheng et al. | |
| 2007/0031063 A1 | 2/2007 | Zhou | |
| 2007/0057049 A9 | 3/2007 | Kundu et al. | |
| 2007/0058040 A1 | 3/2007 | Zhang et al. | |
| 2007/0208680 A1 | 9/2007 | Wang et al. | |
| 2008/0018738 A1 | 1/2008 | Lipton et al. | |
| 2008/0100704 A1 | 5/2008 | Venetianer et al. | |
| 2009/0016600 A1 | 1/2009 | Eaton et al. | |
| 2009/0208111 A1 | 8/2009 | Jeong et al. | |
| 2009/0297023 A1 | 12/2009 | Lipton et al. | |
| 2010/0026802 A1 | 2/2010 | Titus et al. | |

OTHER PUBLICATIONS

Dumont et al, Rushes video parsing using video sequence alignment, IEEE, 2009, Seventh International Workshop on Content-Based Multimedia Indexing, pp. 44-49.

Fan et al, Fast Detection of Retail Fraud Using Polar Touch Buttons, IEEE, Jun. 28, 2009-Jul. 3, 2009, pp. 1266-1269.

Kim, C. et al, An integrated Scheme for Object-based Video Abstraction, Association for Computing Machinery, 8th ACM International Conference on Multimedia, Publication Date: Dec. 1, 2000, pp. 303-311.

(Continued)

*Primary Examiner* — Daniel Mariam  
(74) *Attorney, Agent, or Firm* — Patrick J. Daugherty; Driggs, Hogg, Daugherty & Del Zoppo Co., LPA

(57) ABSTRACT

Human behavior is determined by sequential event detection by constructing a temporal-event graph with vertices representing primitive images of images of a video stream, and also of idle states associated with the respective primitive images. A human activity event is determined as a function of a shortest distance path of the temporal-event graph vertices.

20 Claims, 5 Drawing Sheets

(56) References Cited

OTHER PUBLICATIONS

Yu, Elden et al, Detection of Stable Contacts for Human Motion Analysis, Association for Computing Machinery, Proceedings of the 4th ACM International Workshop on Video Surveillance and Sensor Networks, VSSN-06, Publication Date: Dec. 1, 2006, Item Identifier (DOI): 10.1145/1178781. 1178796.

Quanfu Fan et al, Detecting Sweethearting in Retail Surveillance Videos, IBM paper, IBM T.J. Watson Research Center, Hawthorne, NY, 4 pp, Apr. 24, 2009, ICASSAP 2009.

Quanfu Fan et al, Recognition of Repetitive Sequential Human Activity, IBM paper, IBM T.J. Watson research Center, Hawthorne, NY, 9 pp, Jun. 25, 2009, CVPR 2009.

Pavan Turaga et al, Machine Recognition of Human Activities: A survey, IEEE, 2008, 15 pp.

S. Pankanti et al, Multi-media Compliance: A practical paradigm for managing business integrity, IEEE, Jul. 1, 2009, pp. 1562-1563.

U.S. Appl. No. 12/834,104, filed Jul. 12, 2010.

Non-Final Office Action (Mail Date Feb. 25, 2013) for U.S. Appl. No. 12/834,104, filed Jul. 12, 2010.

Response (File Date May 6, 2013) to Non-Final Office Action (Mail Date Feb. 25, 2013) for U.S. Appl. No. 12/834,104, filed Jul. 12, 2010.

Notice of Allowance (Mail Date May 24, 2013) for U.S. Appl. No. 12/834,104, filed Jul. 12, 2010.

Ivan Laptev and Tony Lindeberg, Space-time Interest Points, Proceedings of the Ninth IEEE International Conference on Computer Vision, ICCV Oct. 2003, pp. 432-439.

Ivan Laptev, Marcin Marszalek, Cordelia Schmid and Benjamin Rozenfeld, Learning realistic human actions from movies, CVPR08, Jun. 23, 2008, 8 pp.

E. W. Dijkstra, A Note on Two Problems in Connexion with Graphs, Numerische Mathematik, vol. 1, Jun. 11, 1959, pp. 269-271.

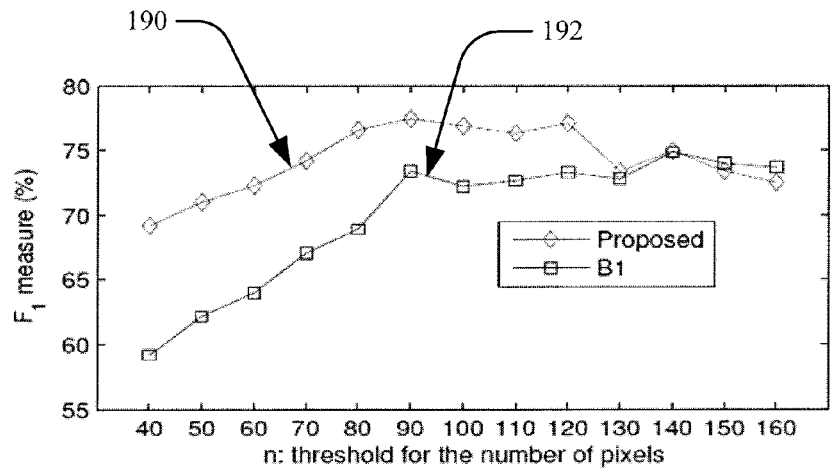
FIG 7
| Method | Precision | Recall | $F_1$ value |
|--------|-----------|--------|-------------|
| Proposed | 73.5% | 81.8% | 77.4% |
| B1 | 72.4% | 77.5% | 74.9% |
| B2 | 77.9% | 69.4% | 73.4% |
FIG 8
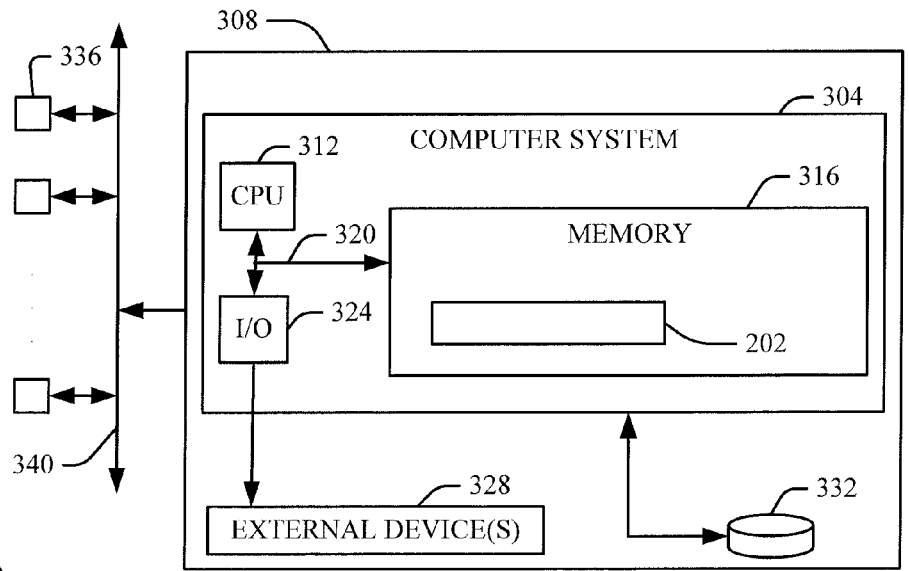
FIG 9

SEQUENTIAL EVENT DETECTION FROM VIDEO

RELATED APPLICATION

This application is a continuation of U.S. application Ser. No. 12/834,104, filed Jul. 12, 2010.

BACKGROUND

The present invention relates to the analysis of human activities in videos, and more particularly to accurately determining and distinguishing behaviors represented thereby.

In a variety of contexts, there may be a desire to monitor human activities for the occurrence or omission of certain activities, for example to comply with activity processes and policies. Compliance failures may result in injuries from failure to observe safety regulations or physical barriers, theft in business and retail establishments and other losses or loss exposures. Gaps in procedure may be identified for remedy, for example through retraining, by capturing and recording behavior deviations with video systems for subsequent or contemporaneous analysis. However, human review and analysis of video feeds is time consuming and perhaps inefficient with respect to human resources allocations, and accordingly it is desirable to implement automated systems for video analysis. Automated analysis of videos for determining human activities and behaviors presents a number of challenges, including providing for desired levels of accuracy in determinations of occurrences of human activities of concern, which must be recognized and sometimes distinguished from other activities, and wherein false alerts and missed event recognitions must occur at an acceptable level.

BRIEF SUMMARY

One aspect of a method for determination of human behavior by sequential event detection includes a processor counting motion pixels determined within each of a pick-up area region of interest and a scan area region of interest of a scanning lane video stream as a function of time, wherein the pick-up area region of interest is different from the scan area region of interest. The processor identifies maximum and minimum counts of the motion pixels over time for the pick-up area region of interest, and maximum counts of the motion pixels over time for the scan area region of interest. The processor also identifies pick-up area primitive frame images as frame images of the video stream that occur during time periods encompassing consecutive maximum counts of the motion pixels for the pick-up area region of interest and that include one of the minimum counts of the motion pixels for the pick-up area region of interest and that each occur prior to times of ones of the maximum counts of the motion pixels for the scan area region of interest. The processor further identifies frame images of the video stream that occur at the times of the respective ones of the maximum counts of the motion pixels for the scan area region of interest as scan area primitive frame images.

In another aspect, a computer system for determination of human behavior by sequential event detection includes a processor, computer readable memory and a computer readable storage medium. Program instructions stored on the computer readable storage medium for execution by the processor via the computer readable memory are to count motion pixels determined within each of a pick-up area region of interest and a scan area region of interest of a scanning lane video stream as a function of time, wherein the pick-up area region of interest is different from the scan area region of interest. The processor thus identifies maximum and minimum counts of the motion pixels over time for the pick-up area region of interest, and maximum counts of the motion pixels over time for the scan area region of interest. Pick-up area primitive frame images are identified as the frame images of the video stream that occur during time periods encompassing consecutive maximum counts of the motion pixels for the pick-up area region of interest and that include one of the minimum counts of the motion pixels for the pick-up area region of interest and that each occur prior to times of ones of the maximum counts of the motion pixels for the scan area region of interest. Scan area primitive frame images are identified as the frame images of the video stream that occur at the times of the respective ones of the maximum counts of the motion pixels for the scan area region of interest.

In still another aspect, a computer program product for determination of human behavior by sequential event detection includes program instructions stored on a computer readable storage medium for execution by a processor to count motion pixels determined within each of a pick-up area region of interest and a scan area region of interest of a scanning lane video stream as a function of time, wherein the pick-up area region of interest is different from the scan area region of interest. The processor thus identifies maximum and minimum counts of the motion pixels over time for the pick-up area region of interest, and maximum counts of the motion pixels over time for the scan area region of interest. Pick-up area primitive frame images are identified as the frame images of the video stream that occur during time periods encompassing consecutive maximum counts of the motion pixels for the pick-up area region of interest and that include one of the minimum counts of the motion pixels for the pick-up area region of interest and that each occur prior to times of ones of the maximum counts of the motion pixels for the scan area region of interest. Scan area primitive frame images are identified as the frame images of the video stream that occur at the times of the respective ones of the maximum counts of the motion pixels for the scan area region of interest.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 7 is a graphical illustration including results of an aspect of the present invention.

FIG. 8 is a tabular illustration including results of an aspect of the present invention.

FIG. 9 is a computerized implementation of an aspect of the present invention.

Figure 1:
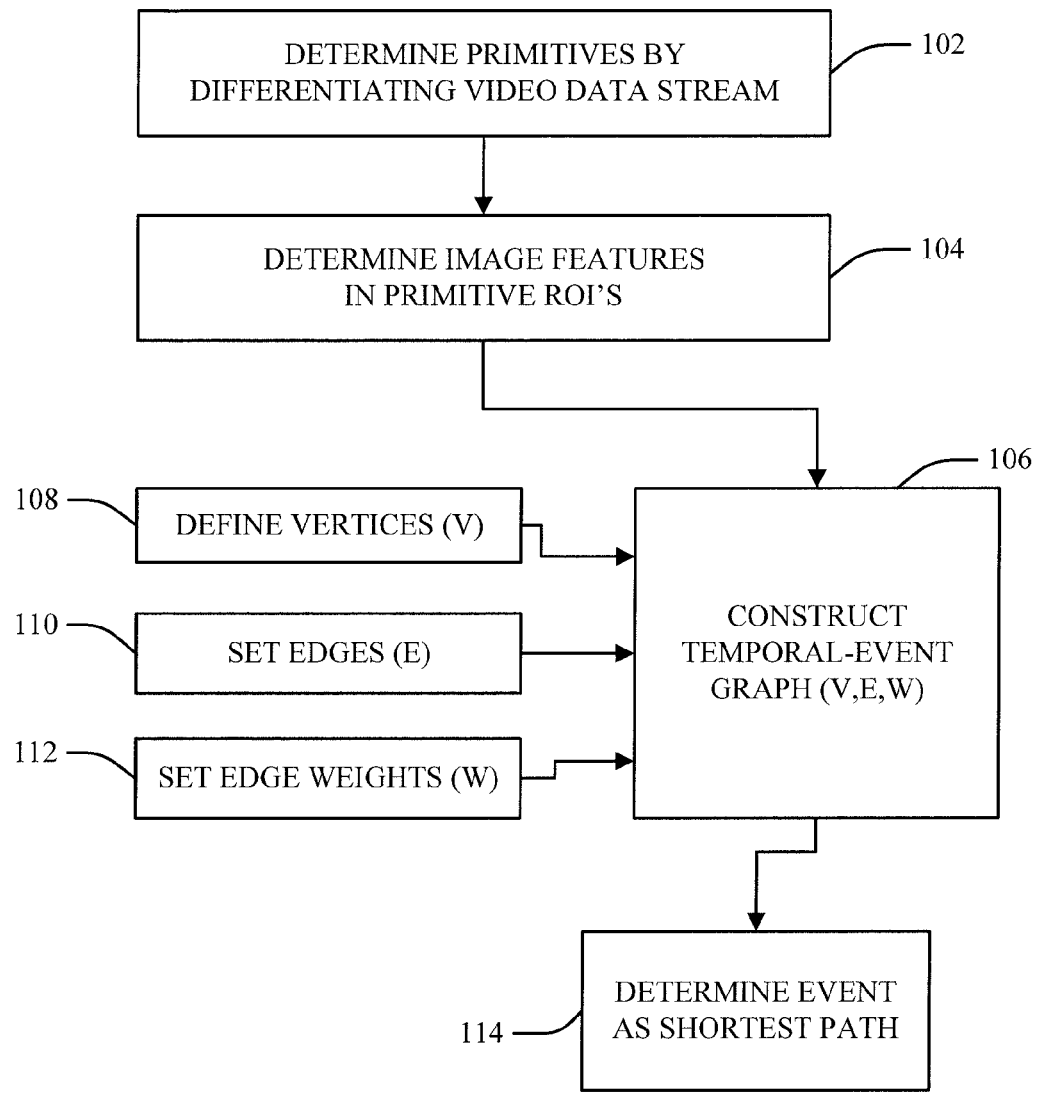
FIG. 1 illustrates an aspect of a method or system for determination of human behavior by sequential event detection according to the present invention.

The drawings are not necessarily to scale. The drawings are merely schematic representations, not intended to portray specific parameters of the invention. The drawings are intended to depict only typical aspects of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium exclude transitory, propagation or carrier wave signals or subject matter and include an electronic, magnetic, optical or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is not a transitory, propagation or carrier wave signal, but instead may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to aspects of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Historically, compliance of human activity with policies, regulations, etc. has typically been enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Some approaches may focus instead on data outputs associated with human activities, business transaction logs, retail receipts, injury reports, etc. Such data may be stored in an intermediate storage medium, such as a relational database, which is then subject to human queries and/or data mining processes. While such data mining processes may be effective in finding some incidents of interest, many statistical anomalies are not strongly correlated with an activity of concern, thus limiting the efficacy of pure data mining. Moreover, events detectable through data mining are necessarily limited to events strongly tied to a paper trail or other data representation output, and accordingly such methods may fail to capture a purely visual event not associated with such a data output: for example, an employee or agent neglecting to place a "Caution" sign near a public area that has just been mopped. Further, some events partly described by a process log may not indicate an associated activity amenable to detection through visual analysis of a video feed, for example where a first authorized person swipes a badge in a badge entry system to gain entry and is tailgated by another, second unauthorized or unrecognized person, the second person also thereby gaining entry without leaving a badge-swipe record.

Automated video surveillance systems and methods are also proposed or known, wherein computers or other programmable devices directly analyze video data and attempt to determine the occurrence of activities of concern. However, object tracking by prior art automated video surveillance systems and methods is often not reliable in realistic, real-world environments and applications due to clutter, poor or variable lighting and object resolutions and distracting competing visual information. Analysis of human activity within the video is generally limited to capturing and recognizing a set of certain predominant activities, each of which requires supervised learning and thus lots of labeled data, and wherein new constraints may not be added or defined to refine or enforce complete visual compliance determinations.

Referring now to FIG. 1, an aspect of a method or system for determination of human behavior by detection of sequential, repetitive events according to the present invention is illustrated. At 102 a programmable device applies an algorithm according to the present invention to parse a video stream into individual primitive frame images. At 104 the programmable device determines or computes visual image features within one or more regions of interest (ROI's) of the primitives detected at 102, which are used to construct a temporal-event graph at 106.

The temporal-event graph is constructed from vertices (V) defined at 108 to represent discrete sequential, repetitive primitive images and associated idle states as a function of edges (E) set at 110 between adjacent primitive frames, and of edge weights (W) set at 112 as a function of knowledge generic to adjacent primitives and of discrepancies between the computed visual features in adjacent primitives, as more fully discussed below. A shortest path process is applied to the temporal-event graph at 114 to determine a human activity event (i.e. an action or omission of a human), thus as a function of one or more discrepancies or consistencies between computed visual features of adjacent primitives, for example in terms of distance, cost or other path values.

Aspects of the present invention segment video into a plurality of discrete, individual primitive frame image events using frame differentiating. Hypothesis generation is performed by combining primitives close in time to form discrete visual events that may include an activity of concern. Frame differentiating into primitive frame image events and hypothesis generation may be a function of observing repetitive human actions expected within certain video scenarios, for example common scanning motions in retail checkout stations or common, expected task motions in factory assembly lines, etc. Thus, human activity may be considered as hypothetical sets of repeated sequential events (or visual work units), each of which is composed of a sequence of relatively isolated and separable primitive frame image events with strong spatiotemporal constraints.

One aspect of the present invention of FIG. 1 receives a video stream of a register from a retail establishment at 102 and identifies and segments certain activities of a cashier within the video feed into a plurality of still primitive pick-up, scan and drop images for analysis, for example to construct discrete sets of possible "sweet-hearting" visual events. Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item.

A significant portion of retail shrink may be attributed to employees and occurs around cashiers at the point of sale (POS). While human surveillance has long been used to monitor transactions at the POS, it is not generally very effective in catching subtle differences in true scan and fake scan motions near bar code scanners, and further suffers from scalability issues. Data mining may be used to analyze transaction logs (TLOG) to infer cashiers' suspicious behaviors based on statistical analysis, but observed statistical anomalies may not be strongly correlated with sweet-hearting or other fraudulent activity of the cashier. Further, fake scans may occur rarely relative to a total number of scanned items processed at a given checkout station: in one example, fake scanning may occur no more frequently than two faked scan items per scanning lane per day, and therefore detecting and preventing this loss requires observing and distinguishing only two items processed by a cashier that do not have a corresponding listing in a retail transaction log of that scanning lane listing all items scanned (generally by reference to the bar code of each item, though other systems for item tracking are contemplated). Therefore, close human attention through video surveillance may not be effective or efficient in preventing sweet-hearting. However, automated determination of and distinguishing between true and false sweet-hearting events may be difficult in the prior art due to the large variety of possible human movements that may be observed and considered.

Figure 2:
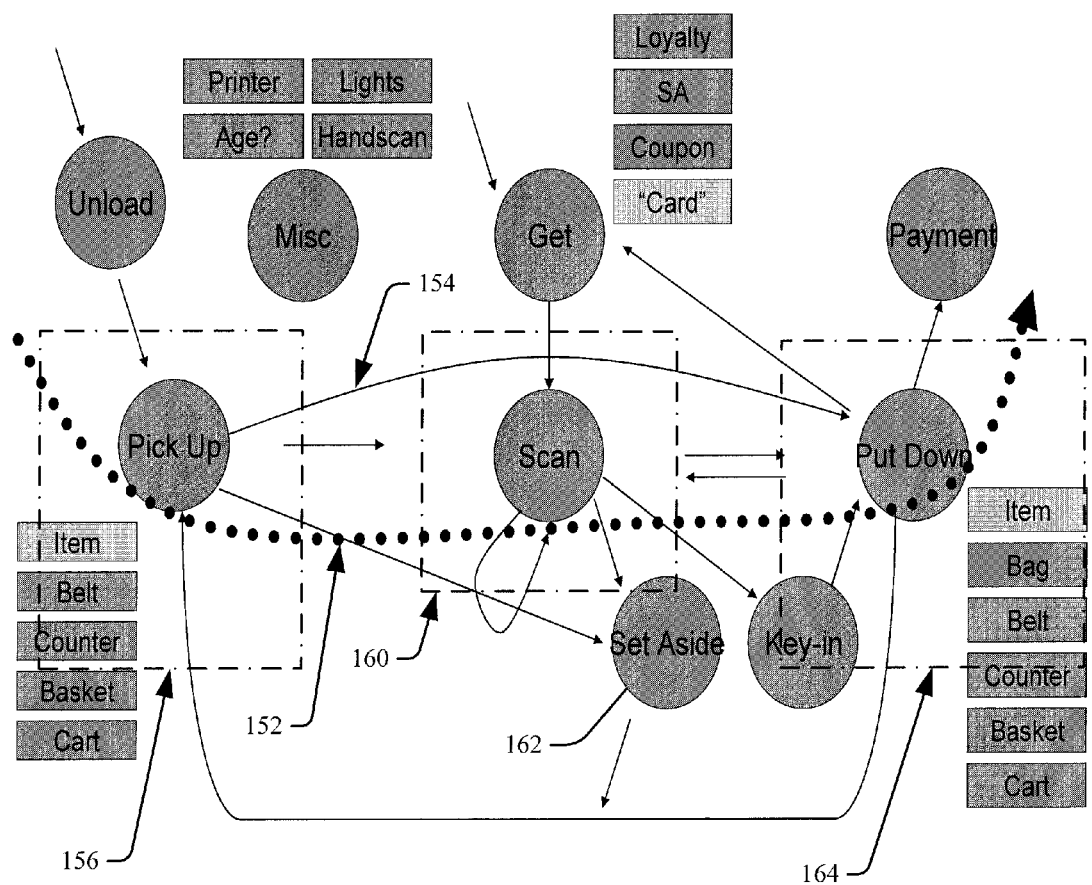
FIG. 2 illustrates an overhead perspective state diagram of possible human movements for automated recognition according to the present invention.

FIG. 2 is an overhead perspective state diagram of a plurality of possible movements and actions 162 of a cashier in a retail context (for example, of a scanning lane) with respect to possible movement vectors 152, 154. (It will be understood that as used herein "cashier" is a generic term to denote a person scanning an item, and that aspects contemplate that the scanning person may be a clerk or cashier as well as a customer, bagger, manager or other person.) Vector 152 is a simple scanning motion path 152, wherein an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions, and each of which may have different time signatures (for example, it may take longer to reach into a cart for a pick-up or a drop relative to a belt pick-up or drop). Thus, true scanning events, which may trigger false fake scan/sweet-hearting alerts, may have a variety of divergent motions and time signatures.

The vectors 154 each represent an observed motion relative to other actions 162 of a cashier and observable in a video feed, illustratively including unloading items, and getting and scanning loyalty cards, supervisor/assistant override cards (SA), coupons or other bar-code cards. Movement of some items from the pick-up area 156 may bypass the scanning area 160 before entering the put-down area 164, sometimes for legitimate purposes, for example set aside in combination with directly keying-in of an item code with a missing or damaged bar code, or in weighing an item sold by weight. Video feeds for individual scans may also differ as a result of different cashier or environmental characteristics, for example an observed receipt printer may function differently as a result of running out of paper, lighting may change due to time of day (daylight versus artificial lighting at night), and the age or physical size or ability of the individual cashiers may impact the range of arm motion, motion paths selected or the times to complete similar paths relative to other cashiers. Accordingly, automated systems must account for many variances and divergences of images of sweet-hearting relative to similar legitimate scanning activities in order to observe and distinguish true fake-scan events from false positives and avoid issuing too many false alarms or missing too many fake scans.

In aspects of the present invention, distinct Region of Interests (ROI) is defined for the creation of and analysis of primitives. Motion pixels obtained by frame differencing (or differentiating) a video stream are counted in each ROI for each frame and normalized by the area of the ROI. Referring again to FIG. 2, in an aspect adapted to determine sweet-hearting in an "in/out" scanning process, a pick-up area 156, a scan area 160 and a drop-off area 164 are defined for creating respective pick-up, scan and drop-off primitives as a function of patterns observed in motion sequences within said areas, generally in response to motion pixels associated with the movement of an item and/or a hand (or both hands) of a cashier within each region. Each area 156/160/164 may itself define a ROI, with motion pixels obtained by frame differencing a video stream counted in each ROI for each frame and normalized by the area of the respective ROI 156/160/164. Alternatively, any region 156/160/164 may encompass multiple distinct (and sometimes overlapping) ROI's to provide additional granularity or primitive creation capabilities.

Figure 3:
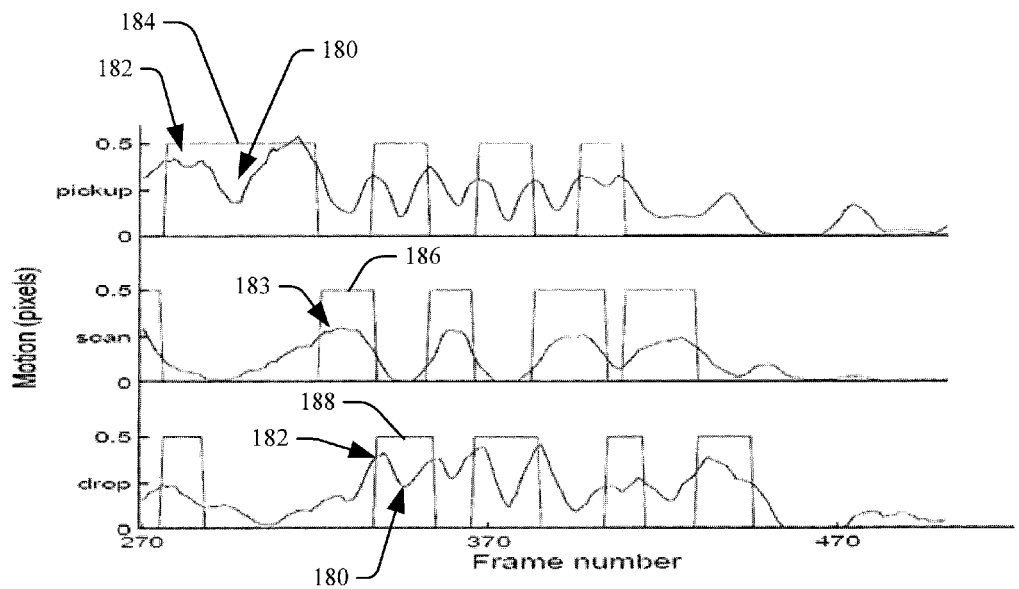
FIG. 3 is a graphical illustration of motion sequences for exemplary events according to the present invention.

One example of pick-up, scan and drop-off primitives created through distinguishing within patterns observed in resulting motion sequences within ROI's and appropriate for practice with the present invention is taught by "Detecting Sweethearting in Retail Surveilliance Videos" by Quanfu Fan et al., ICASSP, 2009, wherein FIG. 3 provides exemplary graphical illustrations for motion sequences for each of pickup, scan and drop events. Each pickup and drop event may be recognized by a pair of peaks 182 with a valley 180 located in-between, depicting a motion change caused by an interaction between a cashier's hand(s) and a specified region during an event. The valleys 180 correspond to the moment of a short pause when a hand is about to reach an item (pickup) or to retrieve an item (drop), and the locations of the two associated peaks 182 roughly correspond to a start and an end time of an event.

Figure 4:
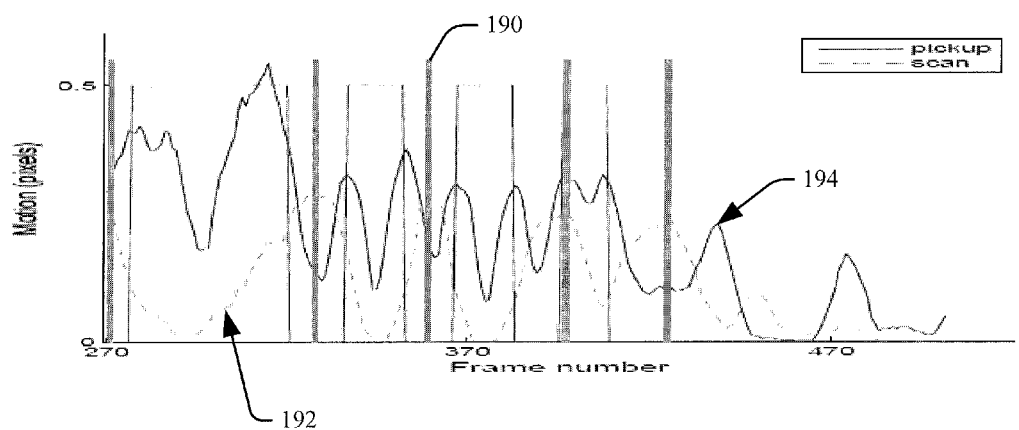
FIG. 4 is a graphical illustration of overlaying exemplary event profiles according to the present invention.

While patterns indicated by primitive events may be visually identifiable, it may be difficult to segment them in a motion sequence. Fortunately, temporal ordering of events may help resolve this problem. Pickup, scan and drop occur sequentially, suggesting that there should be one pickup 184 prior to a scan 186 which is followed by a drop 188. Thus, scan event primitives may be identified by thresholding observed scan motions: for example, referring to FIG. 4, motion peaks 190 in each scan profile 192 may be located and used as dividers to separate pickup and drop events (illustrated presently through overlaying the scan profile 192 and a pick-up motion profile 194).

Space-Time Interest Points (STIPs) are spatiotemporal features computed from local image points with both large intensity change and large variations in time, and roughly correspond to moments when there is abrupt motion change, such as stopping or starting; for example, see "Space-time interest points," I. Laptev and T. Lindeberg, ICCV 2003 at pp. 432-439. Several STIPs may be detected near a cashier's hand at the moment when the hand is about to reach (pickup) or drop an item, and thus a STIPs detector may automatically select spatial and temporal scales with regard to the size and duration of said events wherein a spatio-temporal volume is formed for each STIP and further divided into grids of cuboids. In some aspects, histograms of oriented gradient (HoG) and optic flow (HoF) may be computed, normalized and concatenated into a local descriptor for each cuboid.

A primitive event may also be considered as an interaction between a cashier's hand(s) and a specified area. However, this interaction may be un-oriented and can occur almost anywhere in a given specified area, posing a problem for defining an appropriate ROI for an event model. Providing an ROI large enough to cover all anticipated or possible locations of events to be detected likely includes many irrelevant STIPs resulting from a cashier or other person and, in order to alleviate this problem, multiple-instance learning technique may be applied to build location-aware event models. Thus, some aspects use multiple overlapped ROI's to cover a primitive transaction area as much as possible so that each event is guaranteed to be in at least one ROI, and wherein multiple-instance learning (MIL) is used to resolve problems of learning from incompletely labeled data, for example where correspondences are missing. Unlike supervised learning in which every training instance may be associated with a label, MIL deals with data where labels (usually binary, either 0 or 1) are assigned to bags of instances instead of an individual instance. A positive bag has at least one positive instance that is related to a concept of interest while all instances in a negative bag are negative. The goal of MIL in some aspects according to the present invention is to learn a model of the concept from the incompletely labeled data for classification of unseen bags or instances.

Learning event models from multiple ROI's may be naturally connected to MIL in that each event corresponds to at least one ROI, but wherein the correspondence is not specified. In some aspects, a Bag of Features (BOF) model is built to represent an event wherein spatio-temporal features from a specified region are clustered into discrete "visual words" groups based on their similarities and a histogram of word occurrence frequency is constructed to form a compact representation of the even; the histogram representation is used for classification with approaches. Examples of BOF modeling are taught by "Learning realistic human actions from movies" by Marszalek et al., CVPR08 2008, and other examples will be apparent to one skilled in the art. Thus, for each annotated event, aspects may create a positive bag, the instances of which are the histograms of visual words from all the ROI's under a BOF representation. Negative bags can be generated in a similar way by considering those video segments with sufficient motion change but no primitives annotated in the ground truth. Thus, some aspects according to the present invention use a Support Vector Machine (SVM) based MIL algorithms (MIL-SVM) to learn event models for pickup and drop, for example see S. Andrews, T. Hofmann, and I. Tsochantaridis, "Multiple instance learning with generalized support vector machines," Artificial Intelligence, pp. 943-944, 2002. Further, as scan events may be limited to a small region only use of a single ROI may be required for the scan primitive event determination.

An example for event hypothesis generation from individual primitive frame image events appropriate for use with aspects of the present invention is provided in "Recognition of Repetitive Sequential Human Activity" by Quanfu Fan et al., 2009 IEEE Conference on Computer Vision and Pattern Recognition, which provides a general graphical representation for a sequential event wherein $\{e^k_t\}$ is the $k^{th}$ primitive in a sequential event that occurs at a time t. A sequential event S is defined as a temporally ordered set of primitives $\{e^1_{t1}, e^2_{t2}, \ldots, e^n_{tm}\}$ such that $t_1 < t_2 < \ldots < t_n$. (It will be noted that for purposes clarity superscripts may be omitted when discussing variables herein). Further, each primitive $\{e_{ti}\}$ in a sequential event location node $\{l_{ti}\}$ may be associated with an appearance node $\{v_{ti}\}$ representing visual information and a location node $\{l_{ti}\}$ that denotes a spatial location of where the primitive occurs, wherein in a spatial model a general node C associated with the location nodes $\{l_{ti}\}$ may place spatial constraints on the primitives. The primitives in a sequential event follow a Markovian model, such that the probability of S under the observation O=(v; l) is given by:

$$p(O \mid S) \propto p(v \mid S)p(l \mid S) = \qquad [1]$$

$$p(v_{t_1} \mid e_{t_1}) \prod_2^n p(v_{t_i} \mid e_{t_i}) p(e_{t_i} \mid e_{t_{i-1}}) \cdot \prod_1^n p(l_{t_i} \mid e_{t_i}),$$

where $v=\{v_{t1}, v_{t2}, \ldots,$ and $v_{tm}\}$ and $l=\{l_{t1}, l_{t2}, \ldots, l_{tm}\}$ represent the visual cues and spatial information respectively. Here, $p(v_{ti}|e_{ti})$ is the appearance likelihood model for the primitive $e_{ti}$ while $p(l_{ti}|e_{ti})$ is a spatial likelihood model for $e_{ti}$, and $p(e_{ti}|et_{i-1})$ is the transition probability from primitive $et_{i-1}$ to primitive $e_{ti}$.

Assuming n sets of primitives $\{E_1, E_2, \ldots, E_n\}$ detected in a video sequence, where $E_m$ is a set of primitives with a specific type m (for example, all possible pickups in a cashier scenario), a candidate sequential event S may thus be formed by selecting a primitive from each set with temporal order, considering all such candidates by enumerating samples in $\{E_1, E_2, \ldots, E_n\}$, the candidates starting from a primitive $e^1_{ti} \in E_l$ by a sequence tree denoted by Tr(i, :) rooted at $e^1_{ti}$ wherein any node at the j-th level is selected only from set $E_j$ and all the children of the node occur in later primitive sets. Each path from the root of the sequence tree to a leaf node corresponds to a candidate for a sequential event S.

Visual feature correspondence between adjacent primitives may be useful for pruning out false event alerts. However, strong correspondence in terms of global one-to-one matching of image features is often problematic due to low video quality, rapid motion, occlusion and environmental distraction, etc. Accordingly, aspects of the present invention use weak feature correspondence between event primitives to take advantage of efficient greedy matching of computed visual features to generate an optimal parsing of the video stream in terms of a repetitive sequence of event primitives. Underlying structures of such aspects is the weighted temporal-event graph constructed at 106 of FIG. 1 from preliminary detection of event primitives at their respective spatial locations, wherein a path of the smallest cost corresponds to the optimal parsing of the video into a sequence of pre-defined events at 114. Thus, a simple event model takes the form of a regular expression characterizing repetitive patterns.

More particularly, an event is determinable at 114 as a combination of event primitives, each primitive represented as an unordered set of visual features including both appearance and texture information in terms of colors and gradients. A score may be computed between two primitives reflecting their dissimilarity, which in turn provides for useful clues for combining primitives into events of interest. Accordingly, the video stream may be transformed into a set of feature descriptors at salient locations and represented as $\{v_1, v_2, \ldots, v_{Nf}\}$ where $v_i$ is a description vector (for example, color, gradient, optical flow, etc.) at an $i^{th}$ spatial-temporal salient location in the video. Interest point selection from videos may be accomplished through a variety of methods and systems, including Spatial Temporal Interest Point (STIP) methods and systems as taught by "Space-time interest points," I. Laptev and T. Lindeberg, ICCV 2003, although STIP may have an associated high computational cost.

Aspects of the present invention may provide efficiencies over prior art STIP systems and methods by utilizing a relatively simpler detector that takes locally maximum points of a squared weighted gradient norm function as the interest points in a video, for example pursuant to the following function [2]:

$$g(x, y, t) = \left(\frac{\partial I}{\partial x}\right)^2 + \left(\frac{\partial I}{\partial y}\right)^2 + a\left(\frac{\partial I}{\partial t}\right)^2; \qquad [2]$$

wherein I(x,y,t) represents gray-scale values of the video clip, $\alpha$ is larger than 1 to emphasize the fact that temporally salient points are more likely to be related to interesting events. Points (x, y, t) with relatively small g function values below a threshold $P^{th}$ percentile over a whole video clip are also excluded in order to achieve truly spatial-temporal salient points.

Two kinds of features are extracted from the video relative to (i.e. around and at) the interest points: averaged color values in a small window around the interest points, i.e., [R,G,B]; and image gradient vectors, i.e. the terms [dI/dx, dI/dy] of formulation [2]. Said features together may compose a color feature or description vector containing both appearance and texture information at each detected interest point in a video.

Accordingly, in one aspect, each event primitive P may be treated as a bag of features (BOF) according to formulation [3]:

$$P=\{p_i\}_{i=1}^{Np} \qquad [3]$$

wherein $p_i$ is a color feature vector. Primitives A and B may be defined as consisting of the following respective feature vectors [4]:

$$\{a_i^c\}_{i=1}^m \text{ and } \{b_j^c\}_{j=1}^n \qquad [4]$$

The mean Hausdorff distance $H^c(A,B)$ between the primitives A and B may thus be determined pursuant to formulation [5]:

$$\max\left\{\frac{1}{m}\sum_i \min_j d(a_i^c, b_j^c), \frac{1}{n}\sum_j \min_i d(a_i^c, b_j^c)\right\} \qquad [5]$$

wherein superscript $\{c\}$ refers to the aforementioned first kind of features, the averaged color features. The larger the mean Hausdorff distance, the less consistent the color features are in terms of color appearance. A mean Hausdorff distance is also used for the aforementioned second kind of features, the image gradient vectors, and expressed as $H^g(A, B)$. It will be noted that compared to a standard Hausdorff distance that takes maxima over minima, the mean Hausdorff distance used in the present aspects is more robust to outliers.

The mean Hausdorff distances are combined by using a linear function [6]:

$$\mathcal{H}(A,B)=H^c(A,B)+\gamma H^g(A,B) \qquad [6]$$

where γ is a coefficient balancing the relative importance of the two kinds of features in determining a dissimilarity measure between primitives. It will be noted that the Hausdorff distance is based on a greedy matching of features in the two primitives A and B, reflecting an expectation that adjacent primitives that contain similar objects inside them should have a small dissimilarity measure. It will also be noted that using a Hausdorff distance implicitly defines a weak correspondence between interest points in the two primitives.

Figure 5:
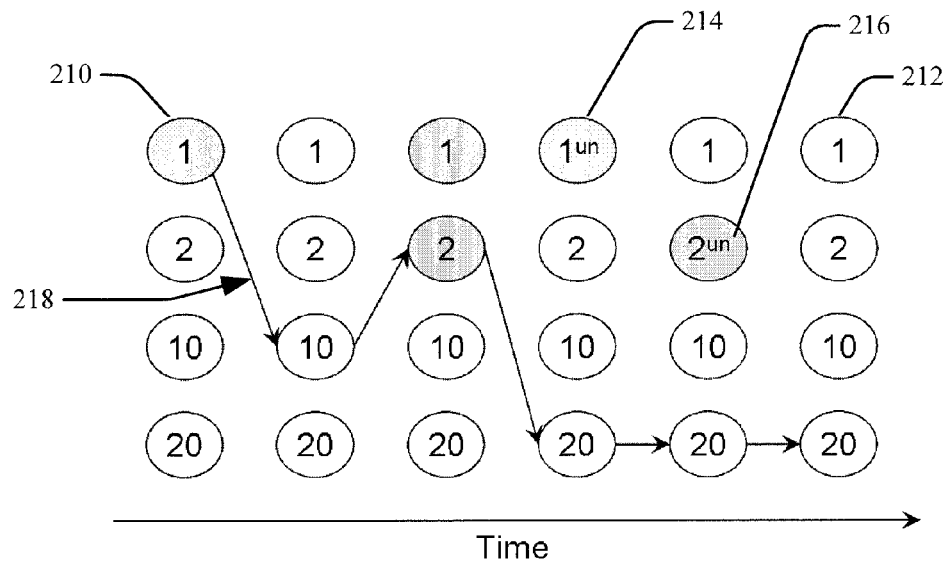
FIG. 5 is a graphical illustration of an exemplary temporal-event graph model according to the present invention.

Accordingly, at 106 the temporal-event graph is defined as G=(V,E,W), where V is a set of vertices representing preliminarily detected frames or sets of consecutive frames that are hypothesized for event primitives, together with vertices representing idle states, and E and W are the edge set and the edge weights respectively. FIG. 5 provides an illustration of an exemplary temporal-event graph model at 106, the model sparse and strictly obeying a temporal monotonicity of the input video wherein edges only exist between adjacent frames from one to the next. The expression $\{a_i\}$ is used to represent vertices 210 of respective primitive types $\{i\}$, and $\{a_{i0}\}$ to represent a corresponding idle state vertices 212 following $\{a_i\}$ in time, and wherein the shaded vertices 210 denote detected primitives. The vertices may be mapped in time between 210 and 212 to the following regular expression [7] in a temporal order sequence:

$$(a_1 a_{10}{}^* a_2 a_{20}{}^* \ldots a_M a_{M0}{}^*)^* \qquad [7]$$

where M is a number of pre-defined event primitives. (M=2 in the example provided by FIG. 5).

According to the present invention, adjacent primitives share similar features as defined above. However, because of the presence of idle states (which do not have their own features by definition) between detected primitives, the computation of feature distance cannot always be done between the vertices representing detected primitives in prior art methods. In contrast, in aspects of the present invention, each detected primitive is given a unique identifier such that all the corresponding idle states following it have the same identifier. By doing this, the computation of feature matching distance can be done between an idle state (which now inherits a set of features from its originating state representing a detected primitive) and another state representing a detected primitive. In effect, a detected primitive is tracked for a certain period of time (for example, a few seconds) by introducing its corresponding following idle state(s), in one aspect providing long-term memory through keeping track of an originating vertex of an idle state.

Accordingly, a vertex $\{a_i\}$ becomes $\{a^p_i\}$, where $\{p\}$ is its identifier, and its corresponding idle states are denoted $\{a^p_{i0}\}$. (It will be noted that the shorthand notations in FIG. 5 do not include the primitive identifier $\{p\}$ for simplicity and clarity in illustration.) Thus, comparison of visual features according to the present invention involves vertex $\{a^p_{i0}\}$ and $\{a^q_{i+1}\}$, where $\{q\}$ is an identification number for a vertex representing a next primitive in an event of interest. Edge set and associated weights may be defined in the graph model illustrated by FIG. 5 according to the following:

For $a^p_i \to a^p_{i0}$ and $a^p_{i0} \to a^p_{i0}$: the weight may be any positive constant $\{c\}$;

For $a^p_i \to a^q_{i+1}$: the weight is the feature distance transformed by the following sigmoid function [8]:

$$s(\mathcal{H}(a^p_i, a^q_{i+1})); \text{ where } s(x) = \frac{K}{1+\exp(-2(x-n))}, \text{ and } K \gg c; \qquad [8]$$

For $a^p_{i0} \to a^q_{i+1}$: the weight is following transformed feature distance [9]:

$$s(\mathcal{H}(a_{i0}{}^p, a_{i+1}{}^q)); \qquad [9]$$

Lastly, for $a^p_M \to a^q_1$ and $a^p_{M0} \to a^q_1$: the weight is the positive constant $\{c\}$, and wherein the weights of all other edges are set to infinity $\{\infty\}$.

It may be verified that a path on the graph G corresponds to a temporal parsing of the video, where the video is mapped into the sequence [7] above since all paths in conflict with said sequence [7] are simply disconnected.

Among possible paths the one with the smallest cost may be picked as the solution at 114, for example through application of the formulation [10]:

$$\sum_{t=1}^{T-1} \overline{w}(v_t, v_{t+1}) \qquad [10]$$

where $\{v_i\}$ are vertices indexed according to time, and T is an overall time. This may be achieved by invoking a Dijkstra algorithm with asymmetric costs, for example as discussed in "A note on two problems in connexion with graphs," E. Dijkstra, Numerische Mathematik, vol. 1, pp. 269-271, 1959.

Referring again to FIG. 5, thus if $1^{un}$ 214 and $2^{un}$ 216 are detected primitive vertices having a high feature discrepancy, then it is implied by the present invention that an optimal path does not go through $1^{un}$ 214 and $2^{un}$ 216. Rather, an optimal path 218 is selected including the sequence $\{a_1 a_{10} a_2 a_{20} a_{20} a_{20}\}$ as a function of weighting and edge setting through feature distance, for example as described above.

Figure 6:
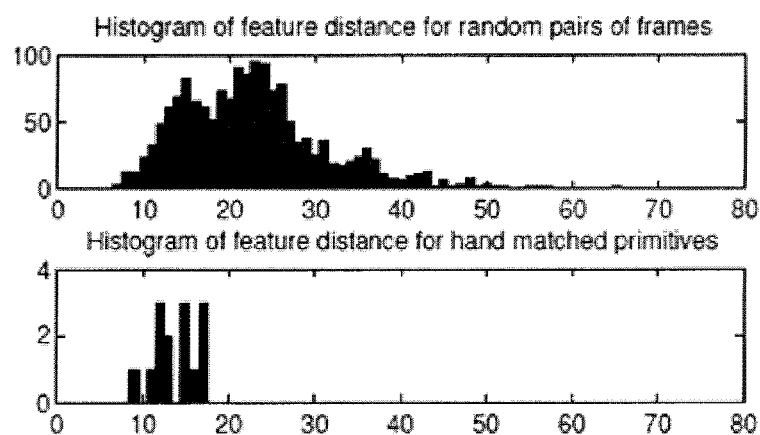
FIG. 6 is a graphical illustration of histograms of distance according to the present invention.

Graph models according to the present invention may further comprehend learning a soft threshold $\{\kappa\}$ for a transformed feature distance, for example pursuant to an estimation algorithm [11]:

$$\kappa = \mu_h + \sigma_h \qquad [11]$$

wherein a set of matched primitives is selected and their distance H set to $h_i$ for the $i^{th}$ pair, and wherein the mean $\{\mu_h\}$ and the standard deviation $\{\sigma_h\}$ are empirically computed. FIG. 6 illustrates histograms of distance according to the present invention between features in matched primitives regions and randomly selected pairs of frames that are 1 to 40 frames apart, and which consider only features inside the regions of interest, in one aspect providing visual indication that the design of edge weights according to aspects of the present invention is reasonable.

FIGS. 7 and 8 illustrate results from one exemplary application of an aspect of the present invention to a one-hour video stream from a retail store scanner lane including 346 checkout events relative to other, prior art processes. In the present example, the video stream is considered with respect to sequential sequences of two primitives, namely a pick-up and a scan (M=2) from the two respective pick-up 156 and scanning 160 Regions of Interest. The primitives detected for constructing the temporal-event graph at 106 are derived from frame differencing the video by taking $D_t = |I_t - I_{t-1}|$, where $\{I_t\}$ is a gray-scale image at time t. A primitive is hypothesized to be present inside a frame if $D_t$ has more than $\{n\}$ pixels with significant values (for example, larger than 20) inside its corresponding region of interest. Other parameters used for application of the above formulations [1] through [11] in the present example include: $\alpha=5$, $P=80$, and $\gamma=0.4$.

FIG. 7 provides a graphical comparison of results of the present example (Proposed curve 190) to an alternative shortest-path algorithm without feature correspondence (B1 curve 192), which is a reduced version of the present "proposed" example. FIG. 8 is a tabular comparison of the current (proposed) aspect and the reduced method (B1) of FIG. 7 and further provides results from another result (B2) from an implementation of a Viterbi algorithm to combine primitives using similar frame differencing with optimized regions of interest, for example as taught by Detecting Sweethearting in Retail Surveilliance Videos discussed earlier. The evaluation metrics in the table of FIG. 8 are precision and recall according to ground truth labeling, wherein a detected checkout event is matched with a real checkout in a ground truth when they have reasonable overlapping, and no reuse of either is allowed, a correctly detected event defined to be one that exists in both ground truth and detection results as reported by a respective method algorithm. The Precision percentage values of the table of FIG. 8 is $\{r_1/r_2\}$ and the Recall percentage value is $\{r_1/r_3\}$ where the number of correctly detected events is $\{r_1\}$, the number of all detected events is $\{r_2\}$ and the number of all ground truth events is $\{r_3\}$, which provide measures of quality of results from two aspects. The overall quality of the results measure is denoted as $\{F_1\}$, and may be determined as $\{2pr/(p+r)\}$. Review of FIGS. 7 and 8 shows that the proposed aspect according to the present invention generally provides improvements in accuracy relative to the B1 and B2 methods, and wherein B1 performs slightly better only at the end of the curves 190 and 192 in FIG. 7 when event primitives are under-detected due to its relatively more conservative approach.

Referring now to FIG. 9, an exemplary computerized implementation of an aspect of the present invention includes computer or other programmable devices 304 in communication with devices 336 (for example, a video camera or video server) that analyzes video data for determination of human behavior according to the present invention, for example in response to computer readable code 302 in a file residing in a memory 316 or a storage system 332 through a computer network infrastructure 308. The implementation is intended to demonstrate, among other things, that the present invention could be implemented within a network environment (e.g., the Internet, a wide area network (WAN), a local area network (LAN) or a virtual private network (VPN), etc.) Communication throughout the network 308 can occur via any combination of various types of communication links: for example, communication links can include addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that an application of an aspect of the invention can be deployed, managed, serviced, etc. by a service provider who offers to implement, deploy, and/or perform the functions of the present invention for others.

The computer 304 includes various components, some of which are illustrated within the computer 304. More particularly, as shown, the computer 304 includes a processing unit (CPU) 312 in communication with one or more external I/O devices/resources 328 and storage systems 332. In general, the processing unit 312 may execute computer program code, such as the code to implement one or more of the process steps illustrated in FIG. 1, which is stored in the memory 316 and/or the storage system 332.

The network infrastructure 308 is only illustrative of various types of computer infrastructures for implementing the invention. For example, in one aspect, computer infrastructure 308 includes two or more computing devices (e.g., a server cluster) that communicate over a network. Moreover, the computer 304 is only representative of various possible computer systems that can include numerous combinations of hardware. To this extent, in other aspects, the computer 304 can include any specific purpose computing article of manufacture including hardware and/or computer program code for performing specific functions, any computing article of manufacture that includes a combination of specific purpose and general purpose hardware/software, or the like. In each case, the program code and hardware can be created using standard programming and engineering techniques, respectively.

Moreover, the processing unit 312 may include a single processing unit, or be distributed across one or more processing units in one or more locations, e.g., on a client and server. Similarly, the memory 316 and/or the storage system 332 can include any combination of various types of data storage and/or transmission media that reside at one or more physical locations. Further, I/O interfaces 328 can include any system for exchanging information with one or more of an external server and or client (not shown). Still further, it is understood that one or more additional components (e.g., system software, math co-processing unit, etc.) not shown can be included in the computer 304 or server or client.

One aspect performs process steps of the invention on a subscription, advertising, and/or fee basis. That is, a service provider could offer to provide automated analysis of video data for determination of human behavior. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another aspect, the invention provides a computer-implemented method for executing one or more of the processes, systems and articles for automated analysis of video data for determination of human behavior described above. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can include one or more of: (1) installing program code on a computing device, such as the computers/devices 304/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular aspects only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or aspect, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various aspects with various modifications as are suited to the particular use contemplated.

What is claimed is:

1. A method for determination of human behavior by sequential event detection, the method comprising:
    obtaining, via a processor, pick-up area motion pixels within a pick-up area region of interest of a scanning lane video stream by frame differencing of the scanning lane video stream, wherein the scanning lane video stream comprises a plurality of video frames;
    obtaining, via the processor, scan area motion pixels within a scan area region of interest of the scanning lane video stream by frame differencing of the scanning lane video stream video frames, wherein the pick-up area region of interest is different from the scan area region of interest;
    counting, via the processor, the obtained pick-up area motion pixels for each frame of the scanning lane video stream and normalizing the counts of the obtained pick-up area motion pixels by an area of the pick-up area region of interest;
    counting, via the processor, the obtained scan area motion pixels for each frame of the scanning lane video stream and normalizing the counts of the obtained scan area motion pixels by an area of the scan area region of interest;
    identifying, via the processor, times of the video stream frame images that have maximum and minimum counts of the normalized counts of the motion pixels relative to others of the normalized counts of the motion pixels over time for the pick-up area region of interest, and times of the video stream frame images that have maximum counts of the normalized counts of the motion pixels relative to others of the normalized counts of the motion pixels over time for the scan area region of interest;
    identifying, via the processor, frame images of the video stream frame images that occur during time periods encompassing the identified times of consecutive ones of the maximum counts of the normalized counts of the motion pixels for the pick-up area region of interest and that include one of the identified times of the minimum counts of the normalized counts of the motion pixels for the pick-up area region of interest, and that each occur at times that are prior to the identified times of ones of the maximum counts of the normalized counts of the motion pixels for the scan area region of interest, as pick-up area primitive frame images; and
    identifying, via the processor, frame images of the video stream frame images that occur at the identified times of the ones of the maximum counts of the normalized counts of the motion pixels for the scan area region of interest, and that occur after the identified times of the pick-up area primitive frame images, as scan area primitive frame images.

2. The method of claim 1, further comprising:
    integrating computer-readable program code into a computer system comprising the processor, a computer readable memory and a computer readable storage medium;
    wherein the computer readable program code is embodied on the computer readable storage medium and comprises instructions that, when executed by the processor via the computer readable memory, cause the processor to perform the steps of obtaining the pick-up area motion pixels within a pick-up area region of interest and the scan area motion pixels within the scan area region of interest, counting the obtained motion pixels within each of the pick-up area region of interest and the scan area region of interest for each frame of the scanning lane video stream and normalizing the counts by the areas of the pick-up area region of interest and the scan area region of interest, identifying the times of the video stream frame images that have the maximum and the minimum counts of the motion pixels for the pick-up area region of interest and the maximum counts of the motion pixels for the scan area region of interest, identifying the pick-up area primitive frame images as frame images of the video stream that occur during the time periods encompassing the identified times of the consecutive maximum counts of the motion pixels for the pick-up area region of interest and that include one of the minimum counts of the normalized counts of the motion pixels for the pick-up area region of interest and that each occur prior to respective ones of the maximum counts of the normalized counts of the motion pixels for the scan area region of interest, identifying the scan area primitive frame images as the frame images of the video stream that occur at the identified times of the ones of the maximum counts of the normalized counts of the motion pixels for the scan area region of interest and that occur after the identified times of the pick-up area primitive frame images.

3. The method of claim 1, further comprising:
    constructing a temporal-event graph comprising a plurality of vertices at different times that represent one each of the pick-up area primitive images, pick-up area primitive idle states that are each associated with respective ones of the pick-up area primitive images, the scan area primitive images, and scan area primitive idle states that are each associated with respective ones of the scan area primitive images, as a function of a discrepancies between visual features computed within the scan area and the pick-up area regions of interest; and determining pick-up and scanning activity events as combinations of pairs of the scan area primitive images and the pick-up area primitive images having shortest distance paths of the temporal-event graph vertices through an intervening pick-up area primitive idle state.

4. The method of claim 3, wherein the shortest distance path is a smallest cost path.

5. The method of claim 4, further comprising:
computing the visual features within the scan area and the pick-up area regions of interest by selecting locally maximum points of a squared weighted gradient norm function of visual image feature interest points in the video stream by favoring more temporally salient points and excluding points with gradient values below a threshold.

6. The method of claim 5, wherein the step of computing the visual features within the scan area and the pick-up area regions of interest further comprises:
extracting an averaged color value feature and an image gradient vector from the video stream; and
defining a color feature vector relative to a selected interest point as a function of an extracted averaged color value feature and an extracted image gradient vector.

7. The method of claim 6, wherein the defining the color feature vector comprises:
computing a first mean Hausdorff distance between the averaged color features of the adjacent first and second primitives;
computing a second mean Hausdorff distance between the image gradient vectors of the adjacent first and second primitives;
measuring a dissimilarity between the adjacent first and second primitives; and
combining the first and second mean Hausdorff distances by a linear function weighting one of the first mean Hausdorff distance and the second mean Hausdorff distance as a function of the measured dissimilarity.

8. The method of claim 7, wherein the step of constructing the temporal-event graph further comprises:
learning the threshold for a color feature vector transformed distance from the pick-up area primitive images to the scan area primitive images as a function of a mean and a standard deviation of the color feature vector transformed distance.

9. A system for determination of human behavior by sequential event detection, comprising:
a processor;
a computer readable memory in communication with the processor; and
a computer readable storage medium in communication with the processor and the computer readable memory;
wherein the processor, when executing program instructions stored on the computer readable storage medium via the computer readable memory:
obtains pick-up area motion pixels within a pick-up area region of interest of a scanning lane video stream by frame differencing of the scanning lane video stream, wherein the scanning lane video stream comprises a plurality of video frames;

obtains scan area motion pixels within a scan area region of interest of the scanning lane video stream by frame differencing of the scanning lane video stream video frames, wherein the pick-up area region of interest is different from the scan area region of interest;
identifies maximum and minimum counts of the motion pixels over time for the pick-up area region of interest, and maximum counts of the motion pixels over time for the scan area region of interest;
counts the obtained pick-up area motion pixels for each frame of the scanning lane video stream and normalizes the counts of the obtained pick-up area motion pixels by an area of the pick-up area region of interest;
counts the obtained scan area motion pixels for each frame of the scanning lane video stream and normalizes the counts of the obtained scan area motion pixels by an area of the scan area region of interest;
identifies times of the video stream frame images that have maximum and minimum counts of the normalized counts of the motion pixels relative to others of the normalized counts of the motion pixels over time for the pick-up area region of interest, and times of the video stream frame images that have maximum counts of the normalized counts of the motion pixels relative to others of the normalized counts of the motion pixels over time for the scan area region of interest;
identifies frame images of the video stream frame images that occur during time periods encompassing the identified times of consecutive ones of the maximum counts of the motion pixels for the pick-up area region of interest and that include one of the identified times of the minimum counts of the normalized counts of the motion pixels for the pick-up area region of interest and that each occur at times that are prior to the identified times of ones of the maximum counts of the normalized counts of the motion pixels for the scan area region of interest, as pick-up area primitive frame images; and
identifies frame images of the video stream frame images that occur at the identified times of the ones of the maximum counts of the normalized counts of the motion pixels for the scan area region of interest, and that occur after the identified times of the pick-up area primitive frame images, as scan area primitive frame images.

10. The system of claim 9, wherein the processor, when executing the program instructions stored on the computer readable storage medium via the computer readable memory, further:
constructs a temporal-event graph comprising a plurality of vertices at different times that represent one each of the pick-up area primitive images, pick-up area primitive idle states that are each associated with respective ones of the pick-up area primitive images, the scan area primitive images, and scan area primitive idle states that are each associated with respective ones of the scan area primitive images, as a function of a discrepancies between visual features computed within the scan area and the pick-up area regions of interest; and
determines pick-up and scanning activity events as combinations of pairs of the scan area primitive images and the pick-up area primitive images having shortest distance paths of the temporal-event graph vertices through an intervening pick-up area primitive idle state.

11. The system of claim 10, wherein the shortest distance path is a smallest cost path.

12. The system of claim 11, wherein the processor, when executing the program instructions stored on the computer readable storage medium via the computer readable memory, computes the visual features within the scan area and the pick-up area regions of interest by selecting locally maximum points of a squared weighted gradient norm function of visual image feature interest points in the video stream by favoring more temporally salient points and excluding points with gradient values below a threshold.

13. The system of claim 12, wherein the processor, when executing the program instructions stored on the computer readable storage medium via the computer readable memory, computes the visual features within the scan area and the pick-up area regions of interest by:
   extracting an averaged color value feature and an image gradient vector from the video stream; and
   defining a color feature vector relative to a selected interest point as a function of an extracted averaged color value feature and an extracted image gradient vector.

14. The system of claim 13, wherein the processor, when executing the program instructions stored on the computer readable storage medium via the computer readable memory, defines the color feature vector by:
   computing a first mean Hausdorff distance between the averaged color features of the adjacent first and second primitives;
   computing a second mean Hausdorff distance between the image gradient vectors of the adjacent first and second primitives;
   measuring a dissimilarity between the adjacent first and second primitives; and
   combining the first and second mean Hausdorff distances by a linear function weighting one of the first mean Hausdorff distance and the second mean Hausdorff distance as a function of the measured dissimilarity.

15. The system of claim 14, wherein the processor, when executing the program instructions stored on the computer readable storage medium via the computer readable memory, constructs the temporal-event graph by learning the threshold for a color feature vector transformed distance from the pick-up area primitive images to the scan area primitive images as a function of a mean and a standard deviation of the color feature vector transformed distance.

16. A computer program product for determination of human behavior by sequential event detection, said computer program product comprising:
   a computer readable storage hardware device having computer readable program code embodied therewith, the computer readable program code comprising instructions that, when executed by a processor, cause the processor to:
   obtain pick-up area motion pixels within a pick-up area region of interest of a scanning lane video stream by frame differencing of the scanning lane video stream, wherein the scanning lane video stream comprises a plurality of video frames;
   obtain scan area motion pixels within a scan area region of interest of the scanning lane video stream by frame differencing of the scanning, lane video stream video frames, wherein the pick-up area region of interest is different from the scan area region of interest;
   identify maximum and minimum counts of the motion pixels over time for the pick-up area region of interest, and maximum counts of the motion pixels over time for the scan area region of interest;
   count the obtained pick-up area motion pixels for each frame of the scanning lane video stream and normalizes the counts of the obtained pick-up area motion pixels by an area of the pick-up area region of interest;
   count the obtained scan area motion pixels for each frame of the scanning lane video stream and normalizes the counts of the obtained scan area motion pixels by an area of the scan area region of interest;
   identify times of the video stream frame images that have maximum and minimum counts of the normalized counts of the motion pixels relative to others of the normalized counts of the motion pixels over time for the pick-up area region of interest, and times of the video stream frame images that have maximum counts of the normalized counts of the motion pixels relative to others of the normalized counts of the motion pixels over time for the scan area region of interest;
   identify frame images of the video stream frame images that occur during time periods encompassing the identified times of consecutive ones of the maximum counts of the motion pixels for the pick-up area region of interest and that include one of the identified times of the minimum counts of the normalized counts of the motion pixels for the pick-up area region of interest and that each occur at times that are prior to the identified times of ones of the maximum counts of the normalized counts of the motion pixels for the scan area region of interest, as pick-up area primitive frame images; and
   identify frame images of the video stream frame images that occur at the identified times of the ones of the maximum counts of the normalized counts of the motion pixels for the scan area region of interest, and that occur after the identified times of the pick-up area primitive frame images, as scan area primitive frame images.

17. The computer program product of claim 16, wherein the computer readable program code instructions, when executed by the processor, further cause the processor to:
   construct a temporal-event graph comprising a plurality of vertices at different times that represent one each of the pick-up area primitive images, pick-up area primitive idle states that are each associated with respective ones of the pick-up area primitive images, the scan area primitive images, and scan area primitive idle states that are each associated with respective ones of the scan area primitive images, as a function of a discrepancies between visual features computed within the scan area and the pick-up area regions of interest; and
   determine pick-up and scanning activity events as combinations of pairs of the scan area primitive images and the pick-up area primitive images having shortest distance paths of the temporal-event graph vertices through an intervening pick-up area primitive idle state.

18. The computer program product of claim 17, wherein the computer readable program code instructions, when executed by the processor, further cause the processor to compute the visual features within the scan area and the pick-up area regions of interest by selecting locally maximum points of a squared weighted gradient norm function of visual image feature interest points in the video stream by favoring more temporally salient points and excluding points with gradient values below a threshold.

19. The computer program product of claim 18, wherein the computer readable program code instructions, when executed by the processor, further cause the processor to compute the visual features within the scan area and the pick-up area regions of interest by:
   extracting an averaged color value feature and an image gradient vector from the video stream; and
   defining a color feature vector relative to a selected interest point as a function of an extracted averaged color value feature and an extracted image gradient vector.

20. The computer program product of claim 19, wherein the computer readable program code instructions, when executed by the processor, further cause the processor to define the color feature vector by:
- computing a first mean Hausdorff distance between the averaged color features of the adjacent first and second primitives;
- computing a second mean Hausdorff distance between the image gradient vectors of the adjacent first and second primitives;
- measuring a dissimilarity between the adjacent first and second primitives; and
- combining the first and second mean Hausdorff distances by a linear function weighting one of the first mean Hausdorff distance and the second mean Hausdorff distance as a function of the measured dissimilarity.

* * * * *